United States Patent [19]

Peels

[11] 4,206,274
[45] Jun. 3, 1980

[54] BATTERY HOLDER

[75] Inventor: Henricus G. Peels, Eindhoven, Netherlands

[73] Assignee: U.S. Philips Corporation, New York, N.Y.

[21] Appl. No.: 968,141

[22] Filed: Dec. 11, 1978

[30] Foreign Application Priority Data

Dec. 22, 1977 [NL] Netherlands ................... 7714233

[51] Int. Cl.² ........................................... H01M 2/10
[52] U.S. Cl. ........................................ 429/99; 429/100
[58] Field of Search .................. 429/96, 97, 98, 99, 429/100

[56] References Cited

U.S. PATENT DOCUMENTS 3,897,268 7/1975 Haraguchi ........................... 429/97

FOREIGN PATENT DOCUMENTS 1208847 2/1960 France .
480194 2/1938 United Kingdom ................ 429/98

Primary Examiner—Donald L. Walton
Attorney, Agent, or Firm—Thomas A. Briody; William J. Streeter; Rolf E. Schneider

[57] ABSTRACT

A battery-retaining device comprising a battery holder pivotable about a pivot arranged in a battery housing from an operating position in the housing to a battery-replacement position outside the housing, one or more batteries being clamped between electrical contacts in the operating position but not being subjected to such clamping in the battery-replacement position. During the pivoting of the holder from the battery-replacement position towards the operating position, the contact force exerted on such one or more batteries by the electrical contacts is gradually increased.

6 Claims, 1 Drawing Figure

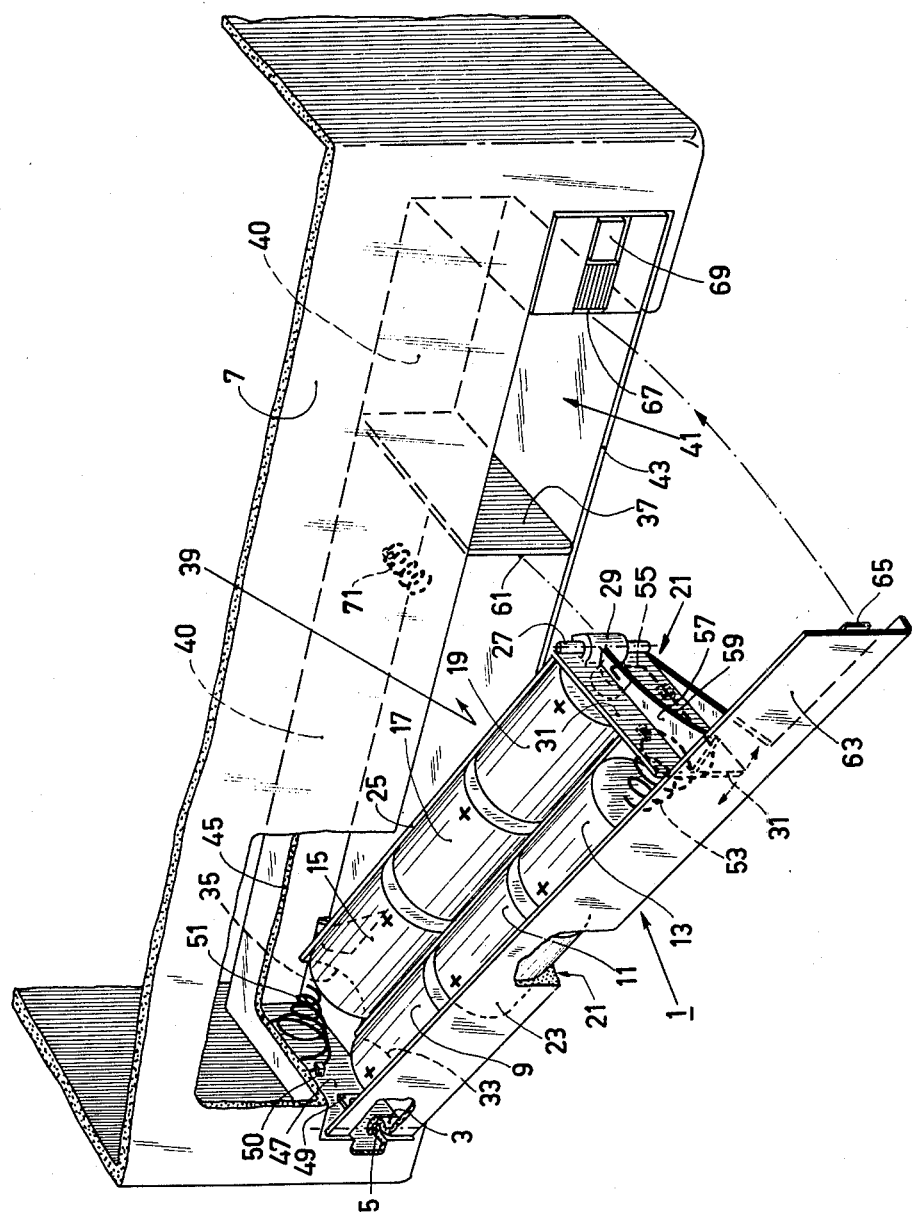

BATTERY HOLDER

This invention relates to a battery holder with a battery which is clamped between a first electrical contact and a second electrical contact in the operating position and which is at least partly enclosed by wall portions of the holder, said holder being pivotable, about a first pivot provided in a battery housing, from the operating position to a battery replacement position, the battery being subjected to a substantially centrically directed end contact force in the operating position, whilst the battery is not subjected to clamping between said electrical contacts in the replacement position.

In a known holder of the described kind (French Pat. No. 1,208,847), the two electrical contacts wherebetween the battery in the holder is to be clamped consist of two metal leaf springs. These leaf springs are rigidly arranged in the battery housing. After the holder has been provided with a new battery in the battery replacement position, the holder is pivoted into the battery housing again. As soon as the contact face of the battery contacts the contact side of the leaf springs arranged in the battery housing, the total contact force (end contact force or clamping force) is present substantially immediately, so that further pivoting of the holder into the operating position must be realised against the frictional force caused by the total contact force on the contact face of the battery. The immediate presence of the total contact force is not only likely to give the user the impression that the holder is jammed, but is also undesirable because the risk of tilting of the battery in the holder is increased by the initially eccentrically acting total force. Particularly when a plurality of batteries is coaxially arranged in the holder, one in prolongation of the other, the said risk of tilting of one or more of the batteries is very real.

The present invention has for its object to provide a battery holder accommodating one or more batteries which are readily accessible in the replacement position and in which the contact force of the batteries is minimized during the pivoting of the batteries to the operating position, this contact force reaching its maximum value only at the instant at which the contact force acts substantially centrically on the batteries.

To this end, a holder in accordance with the invention is characterized in that the holder is provided with a panel which is pivotable about a second pivot with respect to the holder and on which the first electrical contact is provided, one side of said panel being in pressure contact, during the movement of the holder from the replacement position to the operating position, with a wall portion of the battery housing, its other side being in contact, via the moving first electrical contact, with the battery at a contact force which gradually increases until it equals the end contact force due to the pivoting movement of the panel.

The invention will now be described in detail with reference to the accompanying drawing which shows a preferred embodiment of a battery holder in accordance with the invention in the battery replacement position.

The battery holder 1 as shown is made of a synthetic material, for example, polystyrene, and includes a moulded plain bearing 3 which is pivotable about a rigidly arranged pivot 5. The pivot 5 is made to be integral with a wall of a battery housing 7 also made of polystyrene which serves, for example, to accommodate a radio (or radio recorder combination) which is powered by means of batteries 9, 11, 13, 15, 17 and 19, and which is not shown in the drawing for the sake of clarity. The battery holder 1 comprises an elongate, mainly rectangular, bilaterally open container comprising a bottom 21 and two parallel longitudinal walls 23 and 25 which extend perpendicularly from the flat outer surface of the bottom 21. The end of the longitudinal wall 25 which is remote from the pivot 5 is provided with a moulded-on pivot 27 whereabout a plain bearing 29 can rotate. The pivots 5 and 27 are parallel to each other and extend perpendicularly from the outer surface of the bottom 21. The plain bearing 29 is made to be integral with the pivotable panel 31 also of, for example, polystyrene, which extends perpendicularly from the outer surface of the bottom 21. The inner side of the bottom 21 is provided with a profile in the form of two parallel troughs 33 and 35 whose shape corresponds to the cylindrical shape of the batteries 9, 11, 13, 15, 17 and 19. The trough 33 accommodates the batteries 9, 11 and 13 which are coaxially arranged one in prolongation of the other, whilst the trough 35 accommodates the batteries 15, 17 and 19 which are also coaxially arranged one in prolongation of the other. The row of batteries 9, 11 and 13 is parallel to the row of batteries 15, 17 and 19. The battery housing 7 comprises two rectangular spaces 39 and 41 which are separated by a partition 37. The spaces 39 and 41 are bounded on their lower sides by a common lower wall 43, and on their upper sides by a common upper wall 45 which is parallel to the lower wall 43. A rear wall 40 which is common to the spaces 39 and 41 extends perpendicularly to the walls 43 and 45. The space 39 is bounded on one side by the partition 37 which extends perpendicularly to the walls 43 and 45, and on its opposite side by the sidewall 47 which also extends perpendicularly to the walls 43 and 45. The sidewall 47 and the partition 37 are parallel to each other. The partition 37 and the walls 43, 45 and 47 form part of the battery housing 7. The shortest distance between the pivot 5 and the pivot 27 is smaller than the shortest distance between the pivot 5 and the partition 37. The difference between the two said distances is slightly larger than the wall thickness of the plain bearing 29, viewed in a plane perpendicular to the pivot 27.

The sidewall 47 of the space 39 comprises an electrically positive contact in the form of a metal plate 49, and an electrically negative contact in the form of a conical helical spring 51. The contacts 49 and 51 are electrically connected to an electrical power supply circuit (not shown) of the radio accommodated in the battery housing 7. The contacts 49 and 51 (see contact 51) are secured to the sidewall 47 by means of customary, hookshaped projections (see projection 50) on the sidewall. The pivotable panel 31 is provided with an electrically negative contact in the form of a conical helical spring 53 which includes an extension 55. The extension 55 serves as an electrically positive contact. The conical helical spring 53 and the extension 55 are secured to the panel 31 also by means of customary, hook-shaped projections on the panel.

The panel 31 is provided with a plate-shaped guide 57, comprising an end edge 59. The plate-shaped guide 57 extends perpendicularly to the panel 31 and is parallel to the flat outer surface of the bottom 21 of the battery holder 1. The dimensions of the battery holder are such that the batteries can be arranged in the relevant troughs with clearance in the longitudinal direction in the battery replacement position of the holder. During insertion of the batteries, therefore they are not clamped between the electrical contacts, so that not even the slightest contact pressure arises between batteries and contacts. In the replacement position of the holder, the panel 31 encloses an acute angle (smaller than 90°) with the longitudinal wall 23 of the holder, viewed from the inner side of the holder.

When the holder 1 is pivoted into the space 39, the end edge 59 comes into pressure contact with an end edge 61 of the partition 37. The panel 31 is then pivoted towards the batteries, with the result that first the clearance between the batteries and the relevant contacts is eliminated, after which a gradually increasing contact pressure is built up between the batteries and the contacts. The contacts then act substantially centrically on the batteries, so that there is substantially no risk of tilting of the batteries. When the holder 1 has been completely pivoted into the space 39 (operating position), the panel 31 is situated in a plane substantially parallel to the partition 37. In the operating position, the clamping force (contact force) equals the end contact force. By selection of a given steepness of the end edge 59 with respect to the panel 31, the degree at which the contact force increases during a given angular pivoting of the holder can be chosen as desired, assuming that the initial clearance between the batteries in the replacement position and the conical helical springs remains the same. The conical helical springs in the form of a truncated cone offer the advantage of a comparatively long spring travel, so that the substantial differences in the dimensions of otherwise similar batteries which occur in practice can be readily compensated for. The length of the helical springs 51 and 53 should be chosen on the one hand so that dimensional tolerances of the batteries can be compensated for, whilst on the other hand it should be chosen so that the springs act substantially centrically on the batteries. An optimum can be found by choosing a given steepness variation of the end edge 59.

The longitudinal wall 23 of the holder is provided with an extension 63 which closes the space 41 in the operating position of the holder. The extension 63 includes a closing tag 65 which cooperates with a stop edge 67 provided on a button 69 which is pivotable against spring force and which is secured on the battery housing 7. Just before the holder 1 reaches the operating position, the longitudinal wall 25 abuts against a helical spring 71 which is secured to the rear wall 40 and which is thus compressed. The spring 71 forces the holder 1 outwards again after the closing tag 65 disengages from the stop edge 67 by operation of the button 69. The spring 71 is required for pivoting the holder outwards only when the holder does not contain batteries. When the holder contains batteries, the helical springs 51 and 53 tend to relax during the opening, so that the holder is always pivoted outwards. The space 41 can be used for storing a mains connection cable, with or without a fixed connection in the battery housing.

Even though the invention has been described with reference to a preferred embodiment, it is by no means restricted thereto. For example, the pivot of the holder and the pivot of the panel may also form axes which cross each other at right angles. For this purpose, a battery holder in accordance with said French Patent No. 1,208,847 could be provided with a panel which is pivotable with respect to the holder. It is alternatively possible to provide the holder, at the area of its end which is situated near the pivot 5, with a sidewall which extends perpendicularly to the longitudinal wall 23. On a sidewall of this kind, electrical contacts can be provided to cooperate with fixed contacts in the battery housing. The battery holder in accordance with the invention can also be advantageously used for accommodating only one battery. In that case, the contact present on the pivotable panel should cooperate, for example, with a fixed contact arranged in the battery housing near the partition 37. It will be obvious that instead of the described conical helical springs, a variety of leaf springs can also be used for the electrical contacts.

What is claimed is:

1. A device for retaining one or more batteries in position, which comprises a battery housing having a wall portion, a first pivot provided in said housing, a holder for said one or more batteries, said holder being pivotable about said first pivot between an operating position within said housing to a battery-replacement position outside said housing, a first electrical contact and a second electrical contact for clamping said one or more batteries therebetween in said operating position, said one or more batteries thereby being subjected to a substantially centrically directed end contact force in said operating position, said one or more batteries not being subjected to clamping between said electrical contacts in said replacement position, a second pivot provided on said holder, and a panel associated with said holder and being pivotable about said second pivot with respect to said holder, one side of said panel being in pressure contact, during movement of said holder to its operating position, with said housing wall portion, said first electrical contact being provided on the other side of said panel, said first electrical contact thereby creating during said holder movement said end contact force at a gradually increasing strength.

2. A device according to claim 1, in which the panel is provided with a guide in pressure contact with said housing wall portion during said holder movement.

3. A device according to claim 1, in which the first pivot and the second pivot are parallel to each other and are perpendicular to the longitudinal direction of said one or more batteries.

4. A device according to claim 3, in which the holder includes a bottom extending perpendicularly to the first pivot and the second pivot, and two parallel longitudinal walls extending perpendicularly from the bottom, said pivotable panel forming an end wall for the holder, the opposite end of the holder being open, said second electrical contact being arranged in said housing for end contact with said one or more batteries in said operating position.

5. A device according to claim 4, in which the bottom of the holder is formed with two parallel longitudinal compartments for accommodating two rows of batteries electrically connected in series by means of said first electrical contact.

6. A device according to claim 1, in which the first electrical contact comprises a helical spring in the form of a truncated cone having a longitudinal axis extending perpendicularly to the plane of the panel.

* * * * *